(12) United States Patent
Hoyt

(10) Patent No.: US 6,572,772 B2
(45) Date of Patent: Jun. 3, 2003

(54) DIGESTER METHOD FOR PROCESSING FARM WASTE

(76) Inventor: Stephen A. Hoyt, 1177 Rte. 9, Castleton, NY (US) 12033

(*) Notice: Subject to any disclaimer, the term of this patent is extended or adjusted under 35 U.S.C. 154(b) by 0 days.

(21) Appl. No.: 09/998,983

(22) Filed: Nov. 30, 2001

(65) Prior Publication Data

US 2002/0056685 A1 May 16, 2002

Related U.S. Application Data

(62) Division of application No. 09/712,900, filed on Nov. 15, 2000.

(51) Int. Cl.⁷ .................................................. C02F 3/00
(52) U.S. Cl. ........................................ 210/607; 210/613
(58) Field of Search .................................. 210/790, 607, 210/613

(56) References Cited

U.S. PATENT DOCUMENTS

| | | | |
|---|---|---|---|
| 1,392,197 A | | 9/1921 | Morgan |
| 1,989,589 A | | 1/1935 | Fischer et al. |
| 2,064,529 A | | 12/1936 | Fischer et al. |
| 2,458,431 A | | 1/1949 | Schlenz |
| 3,724,542 A | | 4/1973 | Hamilton |
| 3,788,477 A | * | 1/1974 | Love ....................... 210/195.4 |
| 3,933,628 A | | 1/1976 | Varani |
| 3,968,036 A | * | 7/1976 | Liles et al. ................. 210/616 |
| 3,981,800 A | | 9/1976 | Ort |
| 4,067,801 A | | 1/1978 | Ishida et al. |
| 4,316,961 A | | 2/1982 | Klass et al. |
| 4,559,142 A | * | 12/1985 | Morper ....................... 210/603 |
| 4,632,758 A | | 12/1986 | Whittle |
| 4,722,741 A | | 2/1988 | Hayes et al. |
| 4,750,454 A | | 6/1988 | Santina et al. |
| 4,985,149 A | | 1/1991 | Ohshima et al. |
| 6,012,020 A | | 1/2000 | Gardell et al. |
| 6,039,874 A | | 3/2000 | Teran et al. |
| 6,260,215 B1 | | 7/2001 | Miller |
| 6,296,766 B1 | * | 10/2001 | Breckenridge .............. 210/603 |

OTHER PUBLICATIONS

Metcalf & Eddy, American Sewerage Practice, vol. III<Disposal of Sewage, 1935, McGraw–Hill, p. 30,39,40.*

Karl, T.R., and R.W. Knight, "The 1995 Chicago Heat Wave: How likely is a recurrence?", Bulletin of the American Meteorological Society, Dec. 20, 1996, pp. 1–13.

* cited by examiner

*Primary Examiner*—Chester T. Barry
(74) *Attorney, Agent, or Firm*—Hoffman, Warnick & D'Alessandro LLC; Ronald A. D'Alessandro

(57) ABSTRACT

A digester method and system for processing farm waste is provided. Specifically, the present invention provides a small-scale digester that processes approximately 0.1% to 10% of a raw waste stream at a temperature of approximately 100° F. The remaining 90% to 99.1% of the raw waste stream is directed to a waste lagoon without passing through the digester. Once the digester has processed the waste stream directed thereto, the processed waste is fed to the waste lagoon thereby inducing greater methane production.

15 Claims, 7 Drawing Sheets

DIGESTER METHOD FOR PROCESSING FARM WASTE

CROSS-REFERENCE TO RELATED APPLICATION

This application is a divisional application of application Ser. No. 09/712,900 entitled Digester Method and System for Processing Farm Waste, filed Nov. 15, 2000.

BACKGROUND OF THE INVENTION

1. Technical Field

The present invention generally relates to a digester method and system for processing farm and other agricultural/industrial waste. More particularly, the present invention provides a method and system for processing farm waste using a small-scale digester that receives and processes only a small portion of a raw waste stream, thereby inducing greater anaerobic decomposition in an existing waste storage structure.

2. Background Art

On farms, processing waste is a problematic issue. In particular, not only can farm/animal waste cause foul odors, but also can cause water contamination from disease causing organisms released to the surrounding environment. Moreover, should waste be released to the environment surface and ground water supplies could become polluted and harm aquatic organisms. To address these problems, farmers commonly utilize digesters to help process and decompose the waste. The digesters can also be used to capture methane gas, which can later be used as a fuel source for the farm. Accordingly, digesters not only serve to reduce problems attributable to farm waste, but also help provide a fuel source for the farm.

In a common implementation, raw farm waste is gathered in a collection system such as a trench, tank, etc. The entire raw waste stream is then passed to a digester. Once in the digester, the raw waste stream is processed over several days or weeks. During anaerobic digestion, microorganism populations grow as they decompose the waste material. These microorganism populations produce gases such as methane. The gases can be collected from the digester and fed to a generation system to provide power to the farm. Once the waste has been completely processed, the waste stream is then fed to a waste lagoon where the bacteria created during digestion will decompose the waste.

Heretofore, many have attempted to provide improved digesters to more efficiently process the farm waste and harness the gasses produced therefrom. However, to process the entire waste stream, such digesters must be constructed on a large scale. For example, a 1000 cow dairy farm could require a digester with a capacity in excess of 300,000 gallons to process 100% of the waste generated. These large-scale digesters are not only expensive to produce and maintain, but also require a large storage space. In addition, large-scale digesters recover methane only within the digester itself, as opposed to within the waste lagoon. Because the lagoon can be significantly larger than the digester, this limits the total methane that can be recovered. Accordingly, a more productive methane recover operation would be to recover the methane in the lagoon using a lagoon cover or the like.

Accordingly, there exists a need for a digester that does not require large dimensions. In addition, there exists a need for such a digester that need only treat a small portion of a raw waste stream. There also exists a need for a digester that causes methane production to occur in the waste lagoon, as opposed to in the digester. There also exists a need for an less expensive way to control odors and recover methane.

SUMMARY OF THE INVENTION

The present invention overcomes the problems associated with existing systems by providing a small-scale digester method and system. The digester of the present invention requires that only a portion of the raw waste stream be treated. Moreover, the digester of the present invention causes substantially all methane production and anaerobic decomposition to occur in the lagoon.

According to a first aspect of the present invention, a method for digesting waste is provided. The method comprises: (1) providing a digester; (2) directing only approximately 0.1% to 10% of a raw waste stream into the digester; and (3) processing the directed waste stream in the digester.

According to a second aspect of the present invention, a digester is provided. The digester comprises: (1) an inlet for receiving a maximum of approximately 0.1% to 10% of a raw waste stream; (2) a processing tank for processing the received raw waste stream; and (3) at least one outlet for feeding the processed waste stream to a lagoon.

According to a third aspect of the present invention, a digester system is provided. The system comprises: (1) a storage system for storing a raw waste stream; (2) a digester comprising an inlet, a processing tank and at least one outlet, wherein only approximately 0.1% to 10% of the raw waste stream is received from the storage system by the inlet and processed in the processing tank; and (3) wherein the processed raw waste stream is fed through the at least one outlet to a lagoon.

Accordingly a small-scale digester is provided that need only treat approximately 0.1% to 10% of a raw waste stream. The digester of the present invention reduces construction, installation and maintenance costs and allows substantially all methane production to occur in the waste lagoon.

The preferred embodiment of the present invention is designed to solve the problems herein described and other problems not discussed, which are discoverable by a skilled artisan.

BRIEF DESCRIPTION OF THE DRAWINGS

These and other features and advantages of this invention will be more readily understood from the following detailed description of the various aspects of the invention taken in conjunction with the accompanying drawings in which.

Figure 1:
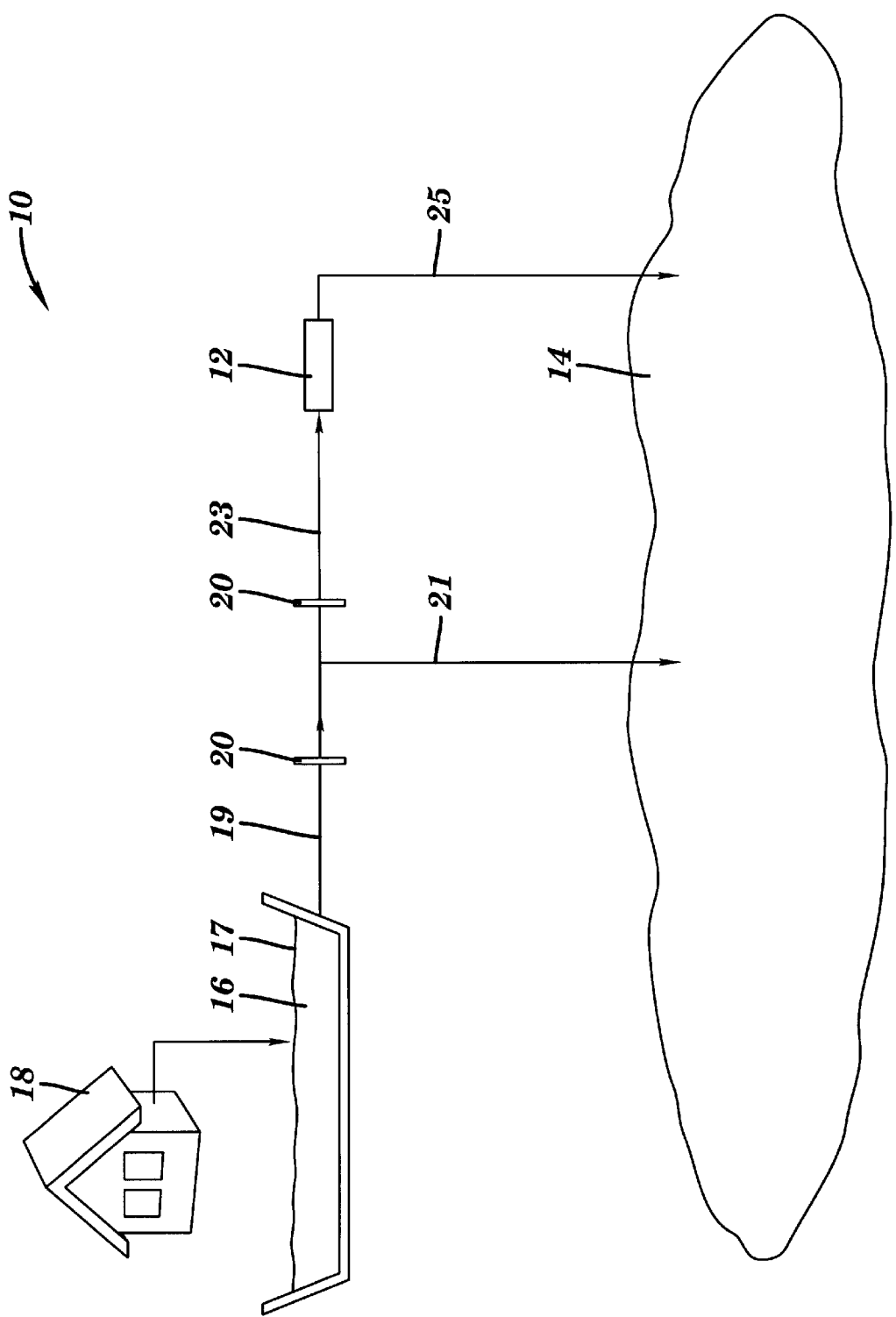
FIG. 1 depicts a digester system according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE DRAWINGS

Referring now to FIG. 1, a digester system 10 is shown. Digester system 10 generally comprises digester 12, waste lagoon 14 and waste collection system 16. Digester 12 will be described in further detail below but is generally a small-scale processing unit for treating waste products. The digester 12 is preferably anaerobic, which is a net energy production process. Raw waste 17 generated by farm 18 will be fed to the collection system 16. The collection system 16 is typically a trench or pit, however, it should be understood that any collection system could be implemented. For example, collection system 16 could be a storage tank or the like. Moreover, it should be understood that although the digester 12 of the present invention is described in conjunction with a farm 18, it can be applied to any agricultural or industrial process in which waste is produced.

From the collection system 16, a raw waste stream 19 will be directed to the waste lagoon 14 and the digester 12. Typically, the raw waste stream 19 is a liquid slurry of waste material. In a preferred embodiment, only approximately 0.1% to 10% of the raw waste stream 19 is fed to the digester 12 as a digester waste stream 23 while the remainder 21 is fed directly to the lagoon. Because the digester 12 will process only a small portion of the raw waste, it is of a much smaller scale than prior art digesters. The digester 12 is preferably custom-constructed to meet the waste production for each farm. Accordingly, if the farm 18 produces approximately 24,000 gallons of waste per day, the digester 12 should be designed to handle a approximately 24–2400 gallons (0.1% to 10%) of waste per day. If the waste is processed for a period of 15 days (commonly known as the "hydraulic retention time"), the digester 12 should have a capacity of at least 3,600–36,000 gallons (slightly more than the volume of raw waste received to prevent overflow). Typical hydraulic retention times can vary between 10–30 days. In previous embodiments, the entire raw waste stream 19 was passed through the digester. This requires a substantially larger digester. In this example involving 24,000 gallons of waste per day, a prior art digester having a capacity of approximately 360,000 gallons would be required. Preferably, the lagoon 14 is a pit or trench where large volumes of waste can be stored since the lagoon 14 will contain all waste produced by a farm over a period of several months. However, it should be understood that the lagoon 14 can also be a large storage vessel or the like.

Processing the waste stream generally includes heating the waste within the digester 12 for a pre-determined period of time (hydraulic retention time). As the waste is processed, bacteria grow. Once the waste has been processed for the required hydraulic retention time, a processed waste stream 25 is fed to the waste lagoon 14. In the lagoon 14, the bacteria will propagate through the other waste, thus, decomposing the waste in the lagoon 14 and reducing the odors emitted therefrom.

Also shown in FIG. 1 are screens 20. Screens 20 are preferably used to filter large particulate matter from the waste streams 19 and 23. It should be appreciated that two screens 20 are shown to illustrate the different locations in which the screens may be positioned. For example, a screen 20 may be placed upstream from the split of the waste stream 19 between the waste lagoon 14 and/or the digester 12 or downstream from the split. In the case of the latter, particulate matter will only be filtered from the digester stream 23.

Figure 2:
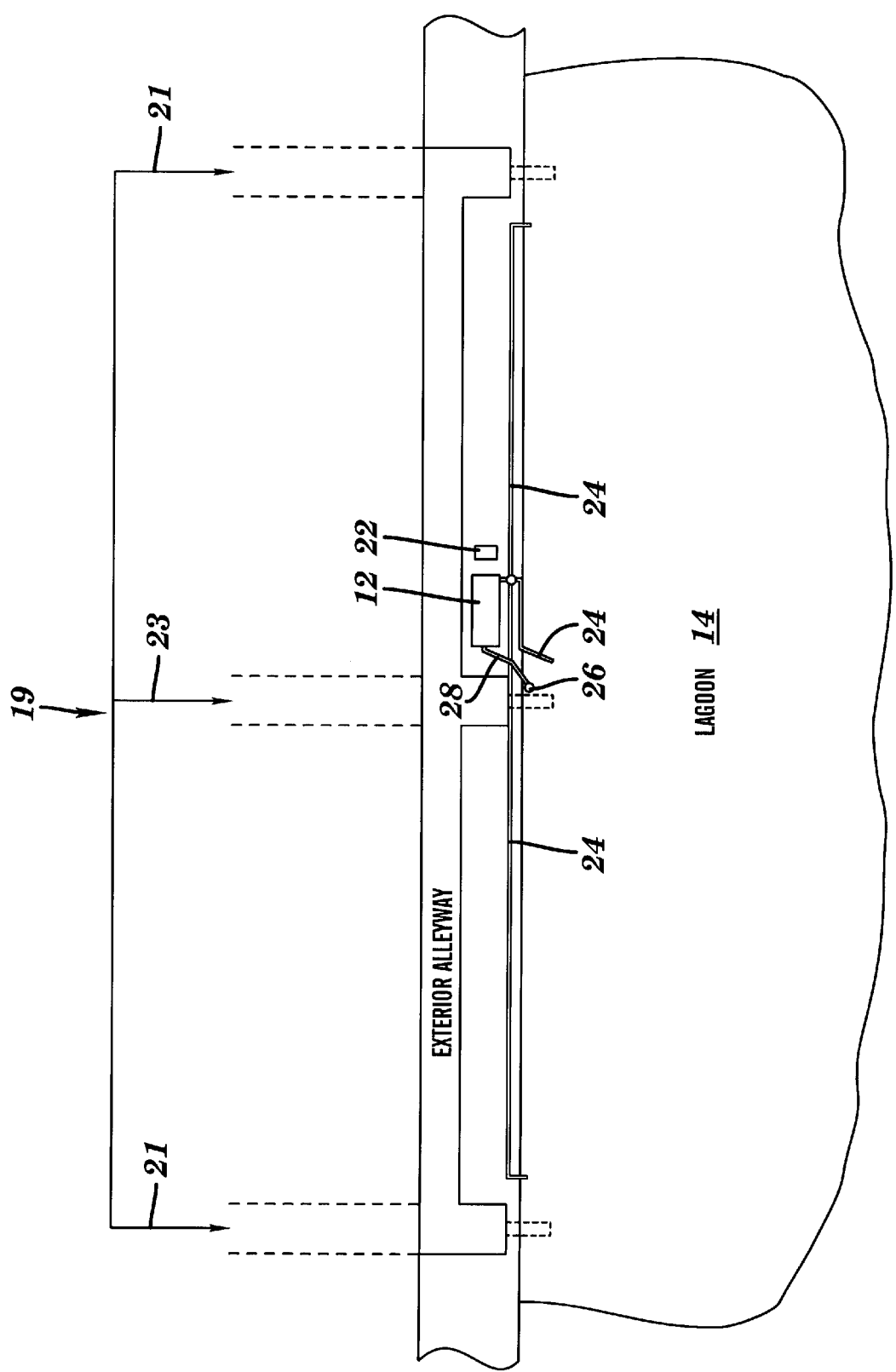
FIG. 2 depicts raw waste stream flow through the digester system of FIG. 1.

Referring now to FIG. 2, the flow of the raw waste stream 19 is shown in greater detail. As depicted, the raw waste stream 19 is broken into at least two streams 21 and 23. Stream 21 flows directly to the waste lagoon 14 while digester stream 23 is directed to the digester 12. Feed pump 26 pumps the digester waste stream into the inlet 28 of the digester 12. It should be understood, however, that feed pump 26 need not be implemented where gravity can drive the waste stream into the digester. As indicated above, the digester waste stream 23 preferably comprises approximately 0.1% to 10% of the total waste stream. Accordingly, the remaining 90% to 99.1% of the waste stream 19 is directed to waste lagoon 14 via streams 21.

As further shown in FIG. 2, seeding outlets 24 are provided to direct the processed waste stream from the digester 12 into the waste lagoon 14. Preferably, the digester includes multiple seeding outlets 24 to better enhance the distribution of processed waste throughout the lagoon. As indicated above, the propagation of bacteria through the lagoon 14 causes the waste in the lagoon to decompose. Accordingly, the better distributed the bacteria, the faster decomposition will occur. It should be appreciated, however, that the precise quantity of seeding outlets 24 may vary depending on the quantity of waste to be decomposed.

A heating system 22 is preferably included to maintain the digester 12 at a temperature of approximately 100° F. The application of heat to the waste stream in the digester 12 allows the bacteria to form, which will decompose the waste in the lagoon 12. Accordingly, the proper maintenance of heat can make the digestion and decomposition process more efficient. It should be understood, however, that although 100° F. is preferred, the temperature to which the waste stream is heated may vary based on the needs of the operator.

Figure 3:
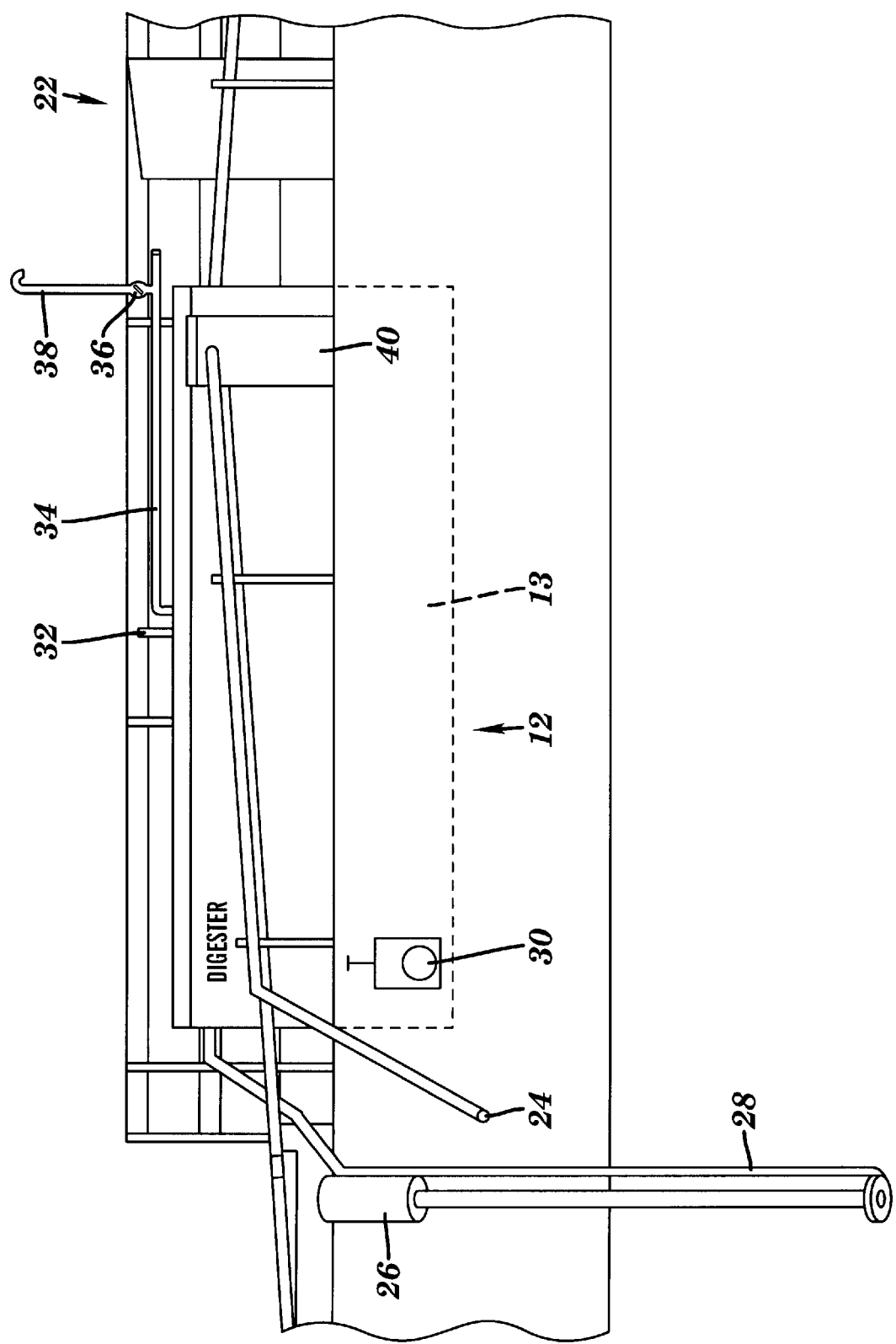
FIG. 3 depicts a side perspective view of a digester according to the present invention.

Referring now to FIG. 3, a more detailed view of the digester 12 is shown. As previously indicated, feed pump 26 directs the waste from collection system (not shown) into the inlet 28. As the waste stream enters the digester 12, it is heated to a temperature of approximately 100° F. by heating system 22. Once heated, the waste stream is digested/processed in a processing tank 13 of the digester 12. Processing includes maintaining the waste stream at approximately 100° F. for the hydraulic retention time (as determined by the operator). Disposed on the top of the digester 12 is gas pipe 34, valve 36 and vent 38. As indicated above, the processing of waste produces various bacteria and gases. The gases generated during the process can be relieved from the system through the gas pipe 34. Valve 36 allows an operator to bleed the gases from the system incrementally. When the valve 36 is open, the gases will be emitted from the digester 12 through the vent. The valve 36 allows an operator to control the output of the gases so that potentially harmful gases are not inadvertently released. Valve 36 also allows an operator to control the heating system 22 from the gases outputted through gas pipe 34.

Also provided in digester 12 is sediment probe 32. Sediment probe 32 detects the presence of waste sediment along the floor of the digester 12. Drain gate valve 30 allows the digester 12 to be completely drained for cleaning or the like. Seed pipe manifold 40 controls the flow of processed waste through the seeding outlets 24. As described above, the processed waste is directed to the waste lagoon 14 preferably via a plurality of seeding outlets 24. The seeding pipe manifold 40 causes the processed waste stream to flow equally through the seeding outlets 24. Moreover, in the event one or more seeding outlets 24 are closed, the seeding pipe manifold 40 will ensure the processed waste stream flows equally through the open seeding outlets 24.

Figure 4:
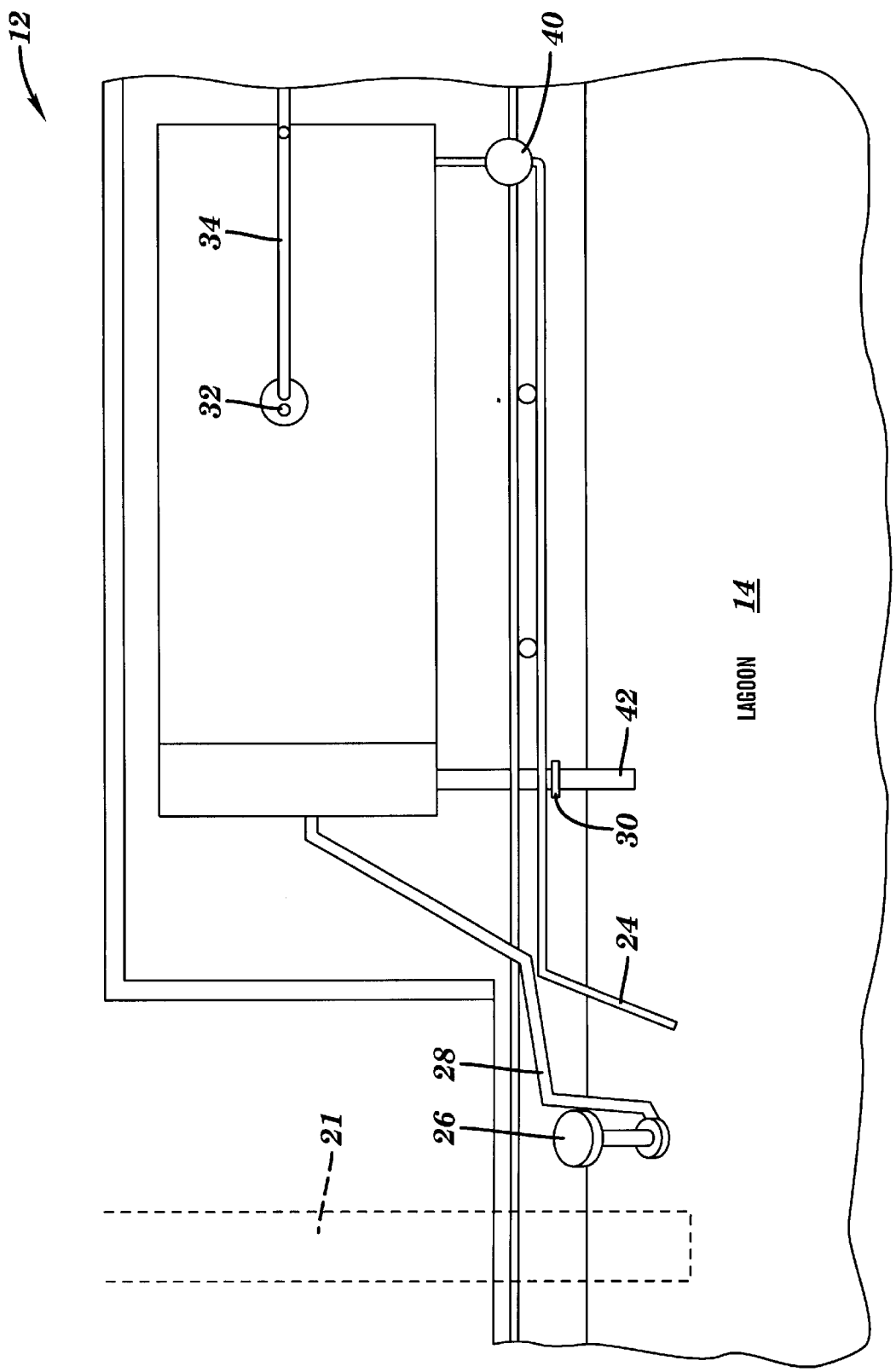
FIG. 4 depicts a top view of the digester.

Referring now to FIG. 4, a top view of the digester 12 is shown. As described above, digester waste stream is directed into the inlet by feed pump 26. The waste is processed at 100° F. within the digester and then directed to the waste lagoon 14 through seeding outlets 24, as controlled by seed pipe manifold 40. Gases produced during the digestion process are removed from the digester 12 through gas pipe 34. Sediment probe 32 detects the presence of waste sediment along the bottom of the digester 12. Drain gate valve 30 allows the digester 12 to be completely drained for cleaning or the like. When opened, any waste in the digester 12 will pass through drain 42 to the waste lagoon 14.

Figure 5:
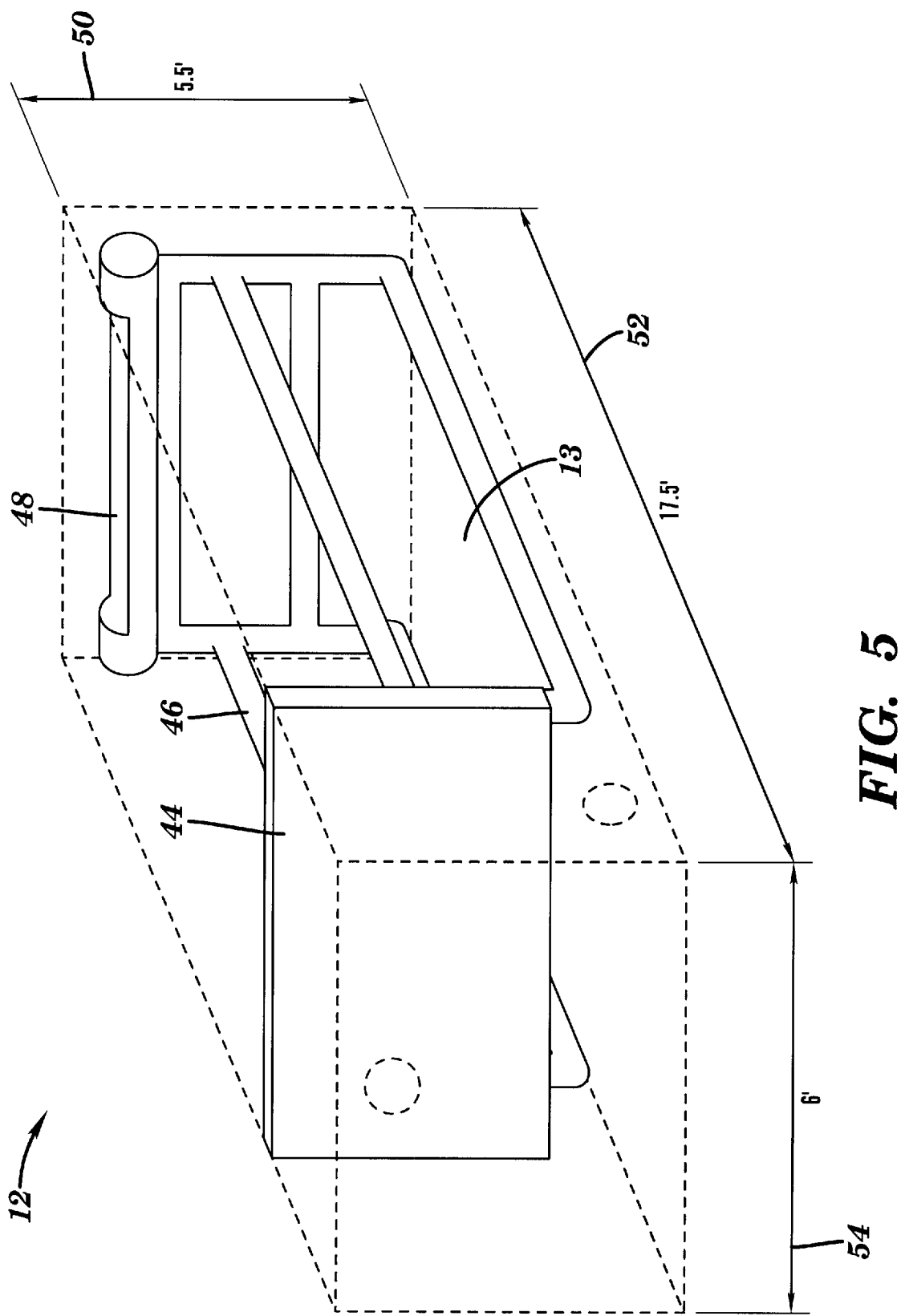
FIG. 5 depicts an orthogonal view of the digester.

FIG. 5 shows an orthogonal view of one embodiment of the digester 12. As shown, digester 12 also may include a baffle 44 to separate an incoming waste stream from a waste stream already being processed. Specifically, the waste stream being processed is maintained at a temperature of approximately 100° F. by heating system 22. However, the incoming waste stream will have a temperature significantly below his level. Accordingly, the incoming waste stream should be segregated from the waste stream being processed until it can likewise be heated to approximately 100° F. This avoids thermal shock of the waste stream being processed and a corresponding deleterious effect on microorganism formation. Also shown in FIG. 5 are internal support structure 46 and solids trap 48. The internal support structure 46 supports internal components of the digester 12 to prevent the damage thereof. Solids trap 48 is where light solid waste material will be gathered. As indicated above, the waste stream is primarily a slurry. However, solids trapped in the slurry are not only difficult to process, but can also damage the components of the digester 12. The heavy solids will fall to the bottom of the digester 12 an can be periodically removed through gate drain. In contrast, the light solids will rise to the top of the digester 12 and potentially block or damage the digester components. By positioning light solids trap 48 proximate the top of the digester, the light solids will be swept out of the digester 12 in the outgoing processed waste stream 25.

As indicated above, previous digesters were constructed to process 100% of a raw waste stream. Accordingly, the dimensions thereof were required to be extremely large. For example, if a farm produced 24,000 gallons of waste per day, and the digester was operated with a hydraulic retention time of 15 days, the total required capacity of the digester would have to be approximately 360,000 gallons. However, under the teachings of the present invention, if only approximately 1% of the raw waste stream was digested over a 15 day period, the digester 12 would need only have a total capacity of approximately 3600 gallons.

FIG. 5 shows the approximate dimensions for a digester 12 in accordance with the present invention. As depicted, the digester 12 would have a length 52 of approximately 17.5 feet, a width 54 of approximately 6 feet and a depth 50 of approximately 5.5 feet. A prior art digester having a capacity of approximately 360,000 gallons would have length of approximately 140 feet, a width of approximately 30 feet and a depth of approximately 12 feet. It should be appreciated, however, that the dimensions shown and described in conjunction with FIG. 5 are shown for illustration purposes only and are not intended to be limiting.

By using a small-scale digester to process only a small portion of raw waste, the total volume of waste to be processed is reduced. Moreover, the small-scale digester 12 forces the majority of methane production to occur within the lagoon, thereby dramatically reducing foul odors. Since the lagoon has substantially greater surface area than the digester, the total production of methane can be increased.

Figure 6:
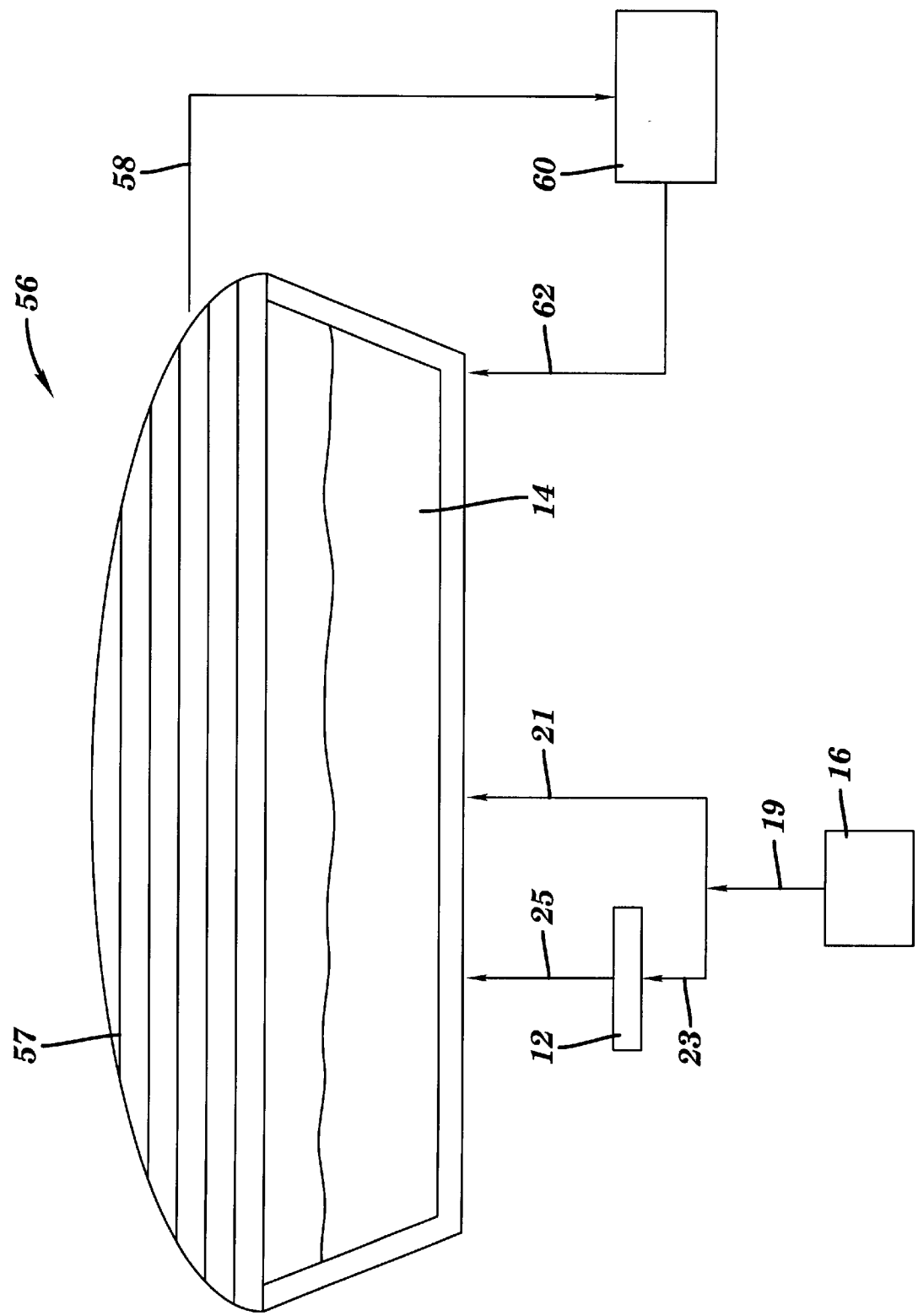
FIG. 6 depicts a waste lagoon cover system.

FIG. 6 depicts a cover system 56 for capturing methane gas produced in the lagoon 14. As shown and described above, raw waste stream 19 is directed from the collection system 16 to the digester 12 and lagoon 14 via streams 23 and 21, respectively. The bacteria produced during digestion will be carried to the lagoon 14 in processed waste stream 25 via seeding outlets (not shown in FIG. 6). The bacteria will propagate through the other waste in the lagoon, thus, causing decomposition and methane gas production. The cover system 56 preferably includes a series of capture mechanisms and pipes 57 that will capture the methane gas as it rises from the lagoon 14. Once captured, the gas is directed via gaseous output 58 to a power generation system 60 or the like. Waste heat produced by the generation system 60 could then be fed back to the lagoon 14 via return 62 to moderate the temperature in the lagoon 14 year round. It should be understood that although methane gas is specifically described herein, other gases may form in lagoon. Accordingly, these other gases may also be captured by cover system 56.

Figure 7:
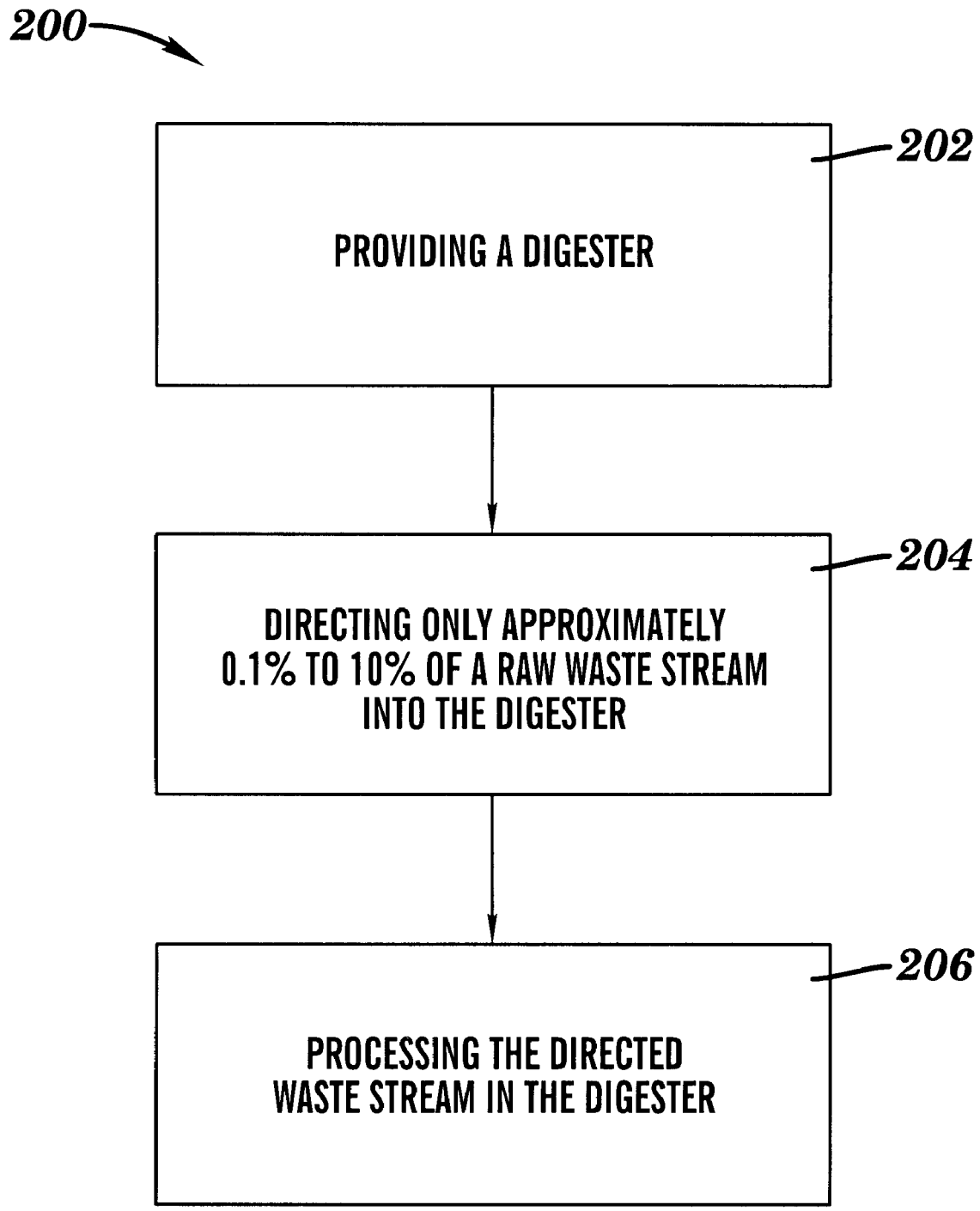
FIG. 7 depicts a flow chart of a method of the present invention.

FIG. 7 shows a flow chart of a method 200 in accordance with the teachings of the present invention. As shown, the first step 200 of method 200 is to provide a digester. The second step 204 is to direct only approximately 0.1% to 10% of a raw waste stream into the digester. The third step 206 of method 200 is to process the directed waste stream in the digester.

It should be understood that although the range of 0.1% to 10% for digestion of raw waste is described herein, other embodiments exist. Specifically, the digester may only receive any percentage or range of percentages of raw waste between 0.1% to 10%. For example, only the digester may only receive 1%, 2%, 3%, 4%, 5%, 6%, 7%, 2% to 5%, 3% to 6%, 2% to 4%, etc. Accordingly, while the above-described range of 0.1% to 10% is intended to provide preferred limits, any variation there between can be implemented.

ILLUSTRATIVE EXAMPLE

The above-described teachings of the present invention are shown in the following illustrative example:

Example 1

An anaerobic digester 12 was installed on a farm producing approximately 24,000 gallons of liquid manure (raw waste stream) per day. The maximum retention time in the lagoon was approximately 6 months or about 4.3 million gallons. An anaerobic digester having a capacity of approximately 3800 gallons was installed and operated continuously at approximately 100° F. The digester 12 was loaded at a rate of 250 gallons every 2 days and processed for approximately 30 days or at a rate of 250 gallons every day and processed for 15 days. This represented approximately 1% of the raw waste stream. The processed waste was seeded into lagoon using 3 seeding outlets. After an initial start-up period of approximately 4 months, the foul odors were largely eliminated. Although the maximum waste in the digester at any one time in this example was approximately 3600 gallons, the digester was constructed with a capacity of 3800 gallons to prevent overflow.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for digesting waste, comprising:

providing a digester;

directing only approximately 0.1% to 10% of a raw waste stream into the digester, wherein the directed waste stream is of equal composition as the raw waste stream; and processing the directed waste stream in the digester.

2. The method of claim 1, wherein the processed waste is fed to a lagoon through a plurality of outlets.

3. The method of claim 1, wherein the raw waste stream has a flow rate of approximately 24,000 gallons per day.

4. The method of claim 3, wherein the directing step comprises directing 0.5% of the raw waste stream into the digester.

5. The method of claim 4, wherein the processing step comprises processing the raw waste stream for approximately 10 to 30 days.

6. The method of claim 3, wherein the directing step comprises directing approximately 1% of the raw waste stream into the digester.

7. The method of claim 6, wherein the processing step comprises processing the raw waste stream for approximately 15 days.

8. The method of claim 1, wherein the directing step comprises directing approximately 2% of the raw waste stream into the digester.

9. The method of claim 1, further comprising maintaining the digester at a temperature of approximately 100° F.

10. The method of claim 1, wherein the providing step comprises providing a digester with a total capacity that is approximately 0.1% to 10% of the raw waste stream.

11. The method of claim 1, further comprising feeding approximately 90% to 99.1% of the raw waste stream directly into a lagoon.

12. A method for digesting waste, comprising:

providing an anaerobic digester;

directing a maximum of approximately 0.1% to 10% of a raw waste stream into the digester, wherein the directed waste stream is of equal composition as the raw waste stream;

processing the directed waste in the digester; and outputting the digested waste to a lagoon through a plurality of outlets.

13. The method of claim 12, wherein the directing step comprises directing approximately 0.5% of a raw waste stream into the digester.

14. The method of claim 12, wherein the directing step comprises directing approximately 1.0% of a raw waste stream into the digester.

15. A method for digesting waste, comprising:

providing an anaerobic digester, directing approximately 2.0% to 5.0% of a raw waste stream into the digester;

processing the directed waste in the digester; and outputting the digested waste to a lagoon through a plurality of outlets.

* * * * *